Figure 1:
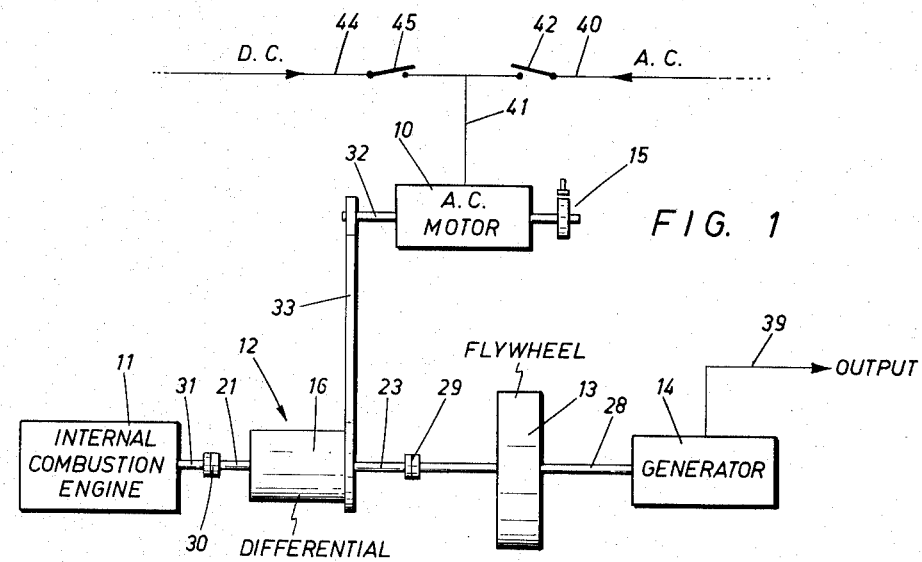

Nov. 30, 1965     K. E. ROLISON     3,221,172

NO-BREAK POWER SUPPLY

Filed Aug. 29, 1962     2 Sheets-Sheet 1

Inventor
KENNETH E. ROLISON
by: *[signature]*
Atty.

Nov. 30, 1965     K. E. ROLISON     3,221,172
NO-BREAK POWER SUPPLY

Filed Aug. 29, 1962     2 Sheets-Sheet 2

Inventor
KENNETH E. ROLISON
by: Victor W. McBurney
Atty.

United States Patent Office 3,221,172
Patented Nov. 30, 1965

3,221,172
NO-BREAK POWER SUPPLY
Kenneth E. Rolison, Islington, Ontario, Canada, assignor of one-third each to John G. Stevens and Michael L. Smith, both of Toronto, Ontario, Canada
Filed Aug. 29, 1962, Ser. No. 220,298
20 Claims. (Cl. 290—4)

This invention relates to a no-break power supply. More particularly, this invention relates to a no-break power supply employing a differential and no clutch of any type.

As is well known, a no-break power supply comprises a generator and two prime movers, one of which normally drives the generator, the other normaly being stationary. When the normally operating prime mover ceases to function for any reason, the normally stationary prime mover is brought up to speed and is connected to drive the generator, usually through a clutch, thereby ensuring a continuous supply of current from the generator. Commonly a kinetic energy supplying device such as a flywheel or a D.C. dynamoelectric machine is coupled to the generator and supplies energy thereto during the transitional period when the generator load is being transferred from one prime mover to the other. Thus, one prior art type of no-break power supply comprises an internal combustion combustion engine adapted to be connected through a normally disengaged clutch to a flywheel, the flywheel being connected in turn to the rotor of an electric generator which in turn is connected to the rotor of an A.C. motor. Another prior art type of no-break power supply employs a D.C. dynamoelectric machine in place of the aforementioned flywheel, both of these devices acting to supply kinetic energy during the aforementioned transitional period.

In the operation of a prior art no-break power supply of either of the aforementioned types, the generator and kinetic energy supplying device are normally driven by the A.C. motor. When there is a failure of the A.C. motor, as, for example, may be caused by an interruption in the power supplied to the A.C. motor, the internal combustion engine is started automatically, brought up to speed, and the clutch is then engaged. The internal combustion engine then drives the generator. During the transitional period when the load is being shifted from one prime mover to the other, the kinetic energy of the flywheel or D.C. machine is utilized to maintain the rotation of the generator.

Such a no-break power supply has a number of disadvantages. The clutch is a weak mechanical link in the system and from time to time requires replacement. Generally speaking, the internal combustion engine, clutch, kinetic energy supplying device, generator and A.C. motor are mounted end-to-end with their respective shafts coupled together, thereby creating a power supply of considerable physical length which may be difficult to install in a small area. When the normally stationary internal combustion engine assumes the load, it is required to drive not only the generator and the kinetic energy supplying device, but also the rotor of the A.C. motor. Auxiliary control means must be provided to start the internal combustion engine, to bring it up to speed and to engage the clutch at the proper time.

In some cases a prior art power supply of either of the aforementioned types utilizes the kinetic energy of the kinetic energy supplying device to crank the internal combustion engine, the clutch being engaged immediately upon the A.C. motor becoming inoperative. While such a system requires no control means to start the internal combustion engine and to bring it up to speed, all of the other aforementioned disadvantages are present in such a system, together with the added disadvantage that the clutch is subjected to substantial wear, since engagement of the clutch is effected when one plate is rotating at normal speed, while the other plate is stationary.

Accordingly, it is one object of my invention to provide a no-break power supply without a clutch.

It is another object of my invention to provide a no-break power supply which employs a differential.

It is yet another object of my invention to provide a no-break power supply in which one of the components, such as one of the prime movers or the generator, may be mounted to one side of the other components, thereby decreasing the physical length of the power supply device.

A further object of my invention is to provide a no-break power supply employing a kinetic energy supplying device which is efficiently used to crank one of the prime movers of the power supply device during the transition period when the load is shifted from the other prime mover.

It is yet an additional object of my invention to provide means to brake the normally operable prime mover during the aforementioned transition period, thereby increasing the torque available to crank the normally stationary prime mover, the braking means holding the rotor of the normally operable prime mover stationary during driving of the generator of the power supply by the normally stationary prime mover, so that the energy of the latter is not expended in rotating the rotor of the normally operable prime mover.

In brief, a no-break power supply embodying my invention comprises a first prime mover, a second prime mover, a differential, braking means and an electric generator. First means connect the differential to rotate the generator. Second means connect the first prime mover to rotate the differential, the first prime mover thereby being adapted to rotate the generator through at least the second means, the differential and the first means. Third means connect the second prime mover to rotate the differential, the second prime mover being adapted to rotate the generator through at least the third means, the differential and the first means. The first prime mover normally drives the generator, while the second prime mover is normally stationary. The braking means are adapted to brake the first prime mover.

Figure 2:
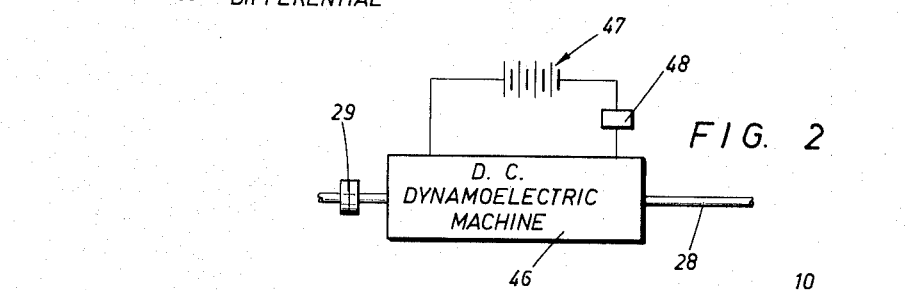
Figure 3:
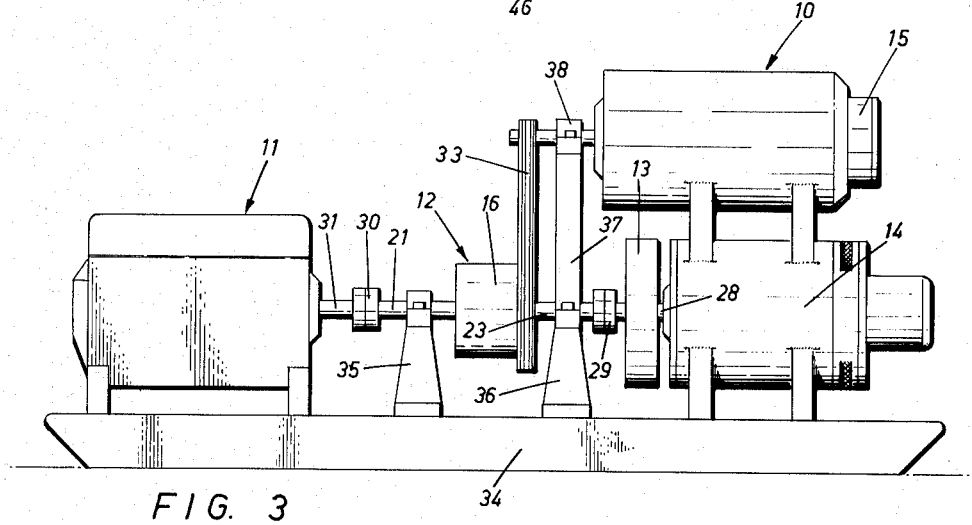
Figure 4:
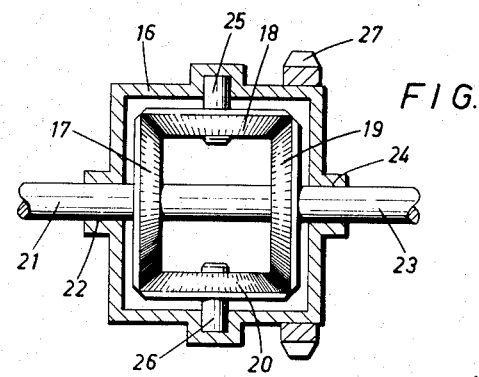
Figure 5:
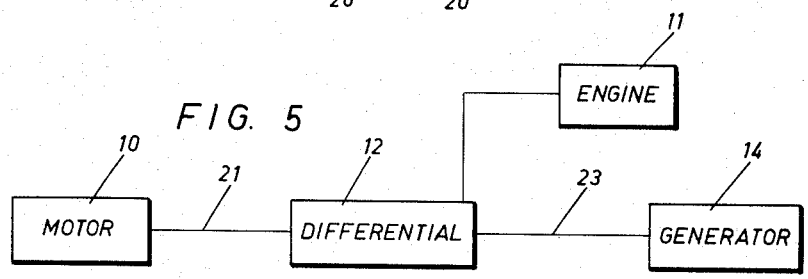
Figure 6:
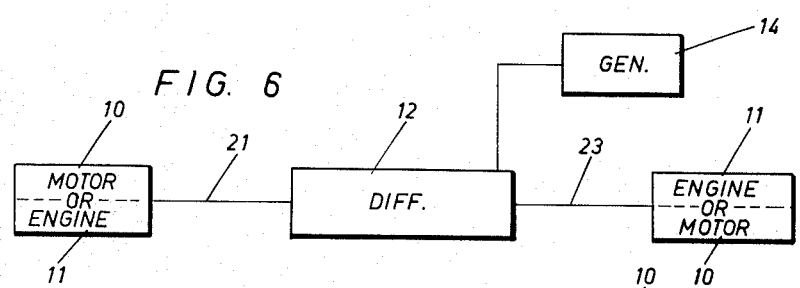
Figure 7:
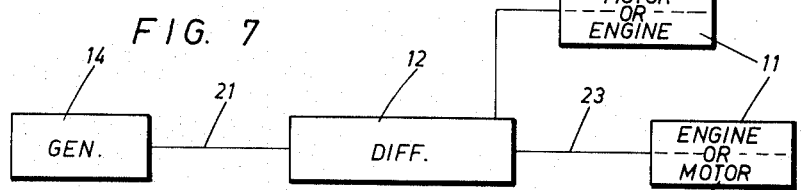

My invention will become more apparent from the following detailed description, taken in conjunction with the drawings, in which;

FIGURE 1 is a schematic representation of a no-break power supply embodying my invention, FIGURE 2 shows an alternative form of kinetic energy supplying device, FIGURE 3 is a more detailed representation of the system shown in FIGURE 1, FIGURE 4 is a detailed view of a differential used in practising my invention, and FIGURES 5–8 show alternative power supplies embodying my invention.

Referring now to FIGURES 1 and 3, I have shown a no-break power supply comprising an A.C. motor 10, an internal combustion engine 11, a differential 12, a flywheel 13 and an electric generator 14 of the A.C. or D.C. type. Coupled to or integral with A.C. motor 10 is a brake 15 of any conventional type.

Differential 12 is best shown in FIGURE 4 and comprises a rotatable housing 16 in which are positioned bevel gears 17, 18, 19 and 20 which mesh with each other as shown. It will be appreciated that one of gears 18 and 20 may be eliminated if desired. Secured to gear 17 to rotate therewith is a shaft 21 which extends outwardly of housing 16 through an opening 22 therein. Secured to gear 19 to rotate therewith is a shaft 23 which extends outwardly of housing 16 through an opening 24 therein. Gears 18 and 20 are mounted on housing 16 for rotation therewith, these gears further being rotatably mounted on shafts 25 and 26 respectively, the latter being secured to housing 16, whereby gears 18 and 20 are rotatable about their longitudinal axes. Secured to housing 16 is a sprocket 27.

Turning again to FIGURES 1 and 3, it will be seen that flywheel 13 is mounted on the shaft 28 of generator 14 and that a coupling 29 is provided connecting shafts 23 and 28 so as to permit shaft 23 to rotate flywheel 13 and generator 14. A coupling 30 connects shaft 21 and the shaft 31 of engine 11 so as to permit engine 11 to rotate shaft 21. The shaft 32 of A.C. motor 10 is provided with a sprocket (not shown), an endless chain 33 running over this latter sprocket and sprocket 27 and thereby permitting motor 10 to rotate housing 16. It will be appreciated, of course, that numerous other means may be employed to connect motor 10 to rotate housing 16.

Engine 11 and generator 14 are fixed to a suitable base plate 34 (FIGURE 3) on which are mounted bearings 35 and 36 in which shafts 21 and 23 respectively are journalled, bearing 36 having an extension 37 carrying a bearing 38 in which shaft 32 is journalled. It will be noted that A.C. motor 10 is mounted on top of generator 14, rather than directly coupled to shaft 28 thereof as in the prior art.

As shown in FIGURE 1, the electrical output from generator 14 is obtained from wires 39 (only one shown). Alternating current from any suitable source is supplied to motor 10 through wires 40 and 41 (only one shown in each case) and a switch 42. Direct current from any suitable source also may be supplied to motor 10 through wires 44 (only one shown), a switch 45 and wires 41.

The embodiment of my invention shown in FIGURE 2 is identical to that shown in FIGURE 1, except that flywheel 13 is shown in FIGURE 1 is replaced by a D.C. dynamoelectric machine 46 connected across a storage battery 47 and a control circuit 48 which prevents overcharging of battery 47.

In the operation of the embodiment of my invention shown in FIGURE 1, switch 45 is normally open, switch 42 is normally closed, brake 15 is released and alternating current is supplied to motor 10 through wires 40 and 41 and switch 42. Engine 11 is normally stationary. Motor 10 drives housing 16 through chain 33 and the two sprockets. Since gear 17 is stationary, while housing 16, and hence gears 18 and 20 carried thereby, are rotating, gears 18 and 20 rotate on shafts 25 and 26 respectively, thereby driving gear 19. Gear 19 rotates shaft 23, coupling 29 and shaft 28, and hence motor 10 drives flywheel 13 and generator 14. When the supply of alternating current to motor 10 is interrupted, switch 42 is automatically opened by any suitable means, and switch 45 is automatically closed, thereby supplying direct current to motor 10 which brakes the motor and hence reduces the speed of rotation of housing 16. The kinetic energy of flywheel 13 is applied through differential 12 to engine 11 cranking the engine, the cranking of the engine being assisted by the torque developed as a result of the braking of motor 10. After cranking, engine 11 fires and is thereafter used to drive flywheel 13 and generator 14, as will become more apparent shortly. As A.C. motor 10 passes through the zero speed point, brake 15 is automatically applied and is used to brake A.C. motor 10 and housing 16 during operation of engine 11. Simultaneously, switch 45 is automatically opened by any suitable means, thereby removing the direct current from motor 10. Under the aforementioned conditions, engine 11 drives flywheel 13 and generator 14 through shaft 31, coupling 30, shaft 21, gears 17, 18, 19 and 20, shaft 23, coupling 29 and shaft 28.

When the alternating line current is restored, switch 42 is closed, engine 11 is stopped, brake 15 is released and A.C. motor 10 again takes over the load. If motor 10 is a synchronous motor, the kinetic energy of flywheel 13 is employed to bring it up to speed, and the flywheel can be assisted in this task by braking engine 11.

The operation of the embodiment of my invention shown in FIGURE 2 is the same as that of FIGURE 1, except that during rotation of generator 14 and D.C. dynamoelectric machine 46 by either prime mover, machine 46 serves as a generator which regulatably charges battery 47 through control circuit 48, and during the transition period when the load is being transferred from one prime mover to the other, machine 46 serves as a D.C. motor obtaining energy from battery 47 which is injected into the system as kinetic energy.

Figure 8:
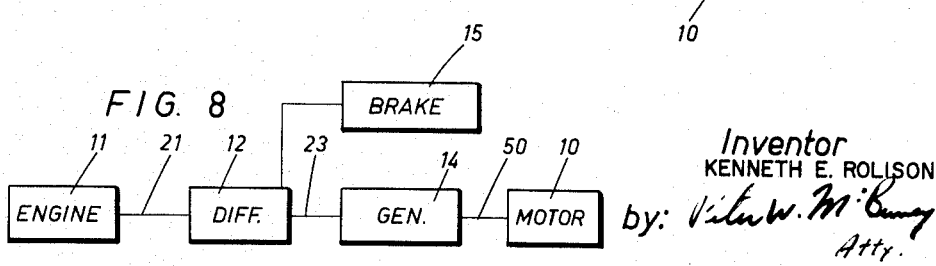

As shown in FIGURES 5–8, those skilled in the art will appreciate that alternative connections to differential 12 other than the connection previously discussed herein are possible. Thus, generator 14 may be coupled to shaft 23 as beforehand, but with motor 10 coupled to shaft 21 and engine 11 connected to rotate housing 16. Alternatively, generator 14 may be connected to be rotated by housing 16, while motor 10 may be coupled to shafts 21 or 23, engine 11 being coupled to shafts 23 or 21 respectively. As yet another alternative, generator 14 may be connected to be rotated by shaft 21, while motor 10 may be connected to rotate shaft 23 or housing 16, engine 11 being connected to rotate housing 16 or shaft 23 respectively. Furthermore, as shown in FIGURE 8, engine 11 may be connected to shaft 21, generator 14 may be connected to shaft 23 and A.C. motor 10 may be coupled to generator 14 by a shaft 50. In this case, brake 15, instead of being used to brake motor 10, as in all previous cases, is used to brake housing 16. When housing 16 is braked, there is a direct driving connection between the engine and generator 14 through shafts 21 and 23 and the gears of differential 12. When there is no braking, housing 16 is permitted to rotate freely so that engine 11 normally is stationary.

While I have described certain preferred embodiments of my invention, those skilled in the art will appreciate that changes and modifications may be made therein without departing from the spirit and scope of my invention.

What I claim as my invention is:

1. A no-break power supply comprising a first prime mover, a second prime mover, a differential, an electric generator, first means connecting said differential to drive said generator, second means connecting said first prime mover to drive said differential, said first prime mover being adapted to drive said generator through at least said second means, said differential and said first means, and third means connecting said second prime mover to drive said differential, said second prime mover being adapted to drive said generator through at least said third means, said differential and said first means, said first prime mover being stationary when said second prime mover is under power and driving said generator, said second prime mover being stationary when said first prime mover is under power and driving said generator.

2. A no-break power supply comprising a first prime mover, a second prime mover, a differential, kinetic energy supplying means, an electric generator, first means connecting said differential to drive said kinetic energy supplying means and said generator, second means connecting said first prime mover to drive said differential, said first prime mover being adapted to drive said generator and said kinetic energy supplying means through at least said second means, said differential and said first means, third means connecting said second prime mover to drive said differential, said second prime mover being adapted to drive said generator and said kinetic energy supplying means through at least said third means, said differential and said first means, said first prime mover normally driving said generator, said second prime mover being stationary when said first prime mover is under power and driving said generator, braking means for braking said first prime mover, and means for actuating said braking means to hold said first prime mover stationary when said second prime mover is under power and driving said generator, said kinetic energy supplying means being adapted to supply kinetic energy to said second prime mover to crank said second prime mover during at least a part of the transitional period when the load of said generator is being transferred from said first prime mover to said second prime mover.

3. The invention according to claim 2 wherein said kinetic energy supplying means is a flywheel.

4. The invention according to claim 2 wherein said kinetic energy supplying means is a D.C. dynamoelectric machine.

5. The invention according to claim 4 including storing means for storing electrical energy and means connecting said dynamoelectric machine to said storing means.

6. The invention according to claim 2 wherein said first prime mover is an electric motor and said second prime mover is an internal combustion engine.

7. The invention according to claim 6 wherein said electric motor is an A.C. motor, and braking means further including means for supplying direct current to said A.C. motor to brake said A.C. motor.

8. A no-break power supply comprising a first prime mover, a second prime mover, a differential, an electric generator, said differential comprising a rotatable housing and at least one first gear and two second gears therein, one of said second gears having a first shaft adapted to rotate with said one of said second gears, the other of said second gears having a second shaft adapted to rotate with said other of said second gears, said first gear meshing with said two second gears and being mounted on said housing for rotation with said housing and for rotation about the longitudinal axis of said first gear, first means connecting said second shaft to drive said generator, second means connecting said second prime mover to drive said first shaft, said second prime mover thereby being adapted to drive said generator through at least said second means, said first shaft, said one of said second gears, said first gear, said other of said second gears, said second shaft and said first means, third means connecting said first prime mover to drive said housing, said first prime mover thereby being adapted to drive said generator through at least said third means, said housing, said first gear, said other of said second gears, said second shaft and said first means, one of said prime movers normally driving said generator, the other of said prime movers being stationary when said one of said prime movers is under power and driving said generator, braking means for braking said one of said prime movers, and means for actuating said braking means to hold said one of said prime movers stationary when said other of said prime movers is under power and driving said generator.

9. The invention according to claim 8 wherein said one of said prime movers is an electric motor and said other of said prime movers is an internal combustion engine.

10. A no-break power supply comprising a first prime mover, a second prime mover, a differential, kinetic energy supplying means, an electric generator, said differential comprising a rotatable housing and at least one first gear and two second gears therein, one of said second gears having a first shaft adapted to rotate with said one of said second gears, the other of said second gears having a second shaft adapted to rotate with said other of said second gears, said first gear meshing with said two second gears and being mounted on said housing for rotation with said housing and for rotation about the longitudinal axis of said first gear, first means connecting said second shaft to drive said generator and said kinetic energy supplying means, second means connecting said second prime mover to drive said first shaft, said second prime mover thereby being adapted to drive said generator and said kinetic energy supplying means through at least said second means, said first shaft, said one of said second gears, said first gear, said other of said second gears, said second shaft and said first means, third means connecting said first prime mover to drive said housing, said first prime mover thereby being adapted to drive said generator and said kinetic energy supplying means through at least said third means, said housing, said first gear, said other of said second gears, said second shaft and said first means, one of said prime movers normally driving said generator and said kinetic energy supplying means, the other of said prime movers normally being stationary when said one of said prime movers is under power and driving said generator, braking means for braking said one of said prime movers, and means for actuating said braking means to hold said one of said prime movers stationary when said other of said prime movers is under power and driving said generator, said kinetic energy supplying means being adapted to supply kinetic energy to said other of said prime movers to crank said other of said prime movers during at least a part of the transitional period when the load of said generator is being transferred from said one of said prime movers to said other of said prime movers.

11. The invention according to claim 10 wherein said one of said prime movers is an electric motor and said other of said prime movers is an internal combustion engine.

12. The invention according to claim 11 wherein said kinetic energy supplying means is a flywheel.

13. A no-break power supply comprising a first prime mover, a second prime mover, a differential, an electric generator, said differential comprising a rotatable housing and at least one first gear and two second gears therein, one of said second gears having a first shaft adapted to rotate with said one of said second gears, the other of said second gears having a second shaft adapted to rotate with said other of said second gears, said first gear meshing with said two second gears and being mounted on said housing for rotation with said housing and for rotation about the longitudinal axis of said first gear, third means connecting said housing to drive said generator, second means connecting said second prime mover to drive said first shaft, said second prime mover thereby being adapted to drive said generator through at least said second means, said first shaft, said one of said second gears, said first gear, said housing and said third means, first means connecting said first prime mover to drive said second shaft, said first prime mover thereby being adapted to drive said generator through at least said first means, said second shaft, said other of said second gears, said first gear, said housing and said third means, one of said prime movers normally driving said generator, the other of said prime movers being stationary when said one of said prime movers is under power and driving said generator, braking means for braking said one of said prime movers, and means for actuating said braking means to hold said one of said prime movers stationary when said other of said prime movers is under power and driving said generator.

14. The invention according to claim 13 wherein said one of said prime movers is an electric motor and said other of said prime movers is an internal combustion engine.

15. A no-break power supply comprising a first prime mover, a second prime mover, a differential, kinetic energy supplying means, an electric generator, said differential comprising a rotatable housing and at least one first gear and two second gears therein, one of said second gears having a first shaft adapted to rotate with said one of said second gears, the other of said second gears having a second shaft adapted to rotate with said other of said second gears, said first gear meshing with said two second gears and being mounted on said housing for rotation with said housing and for rotation about the longitudinal axis of said first gear, third means connecting said housing to drive said generator and said kinetic energy supplying means, second means connecting said second prime mover to drive said first shaft, said second prime mover thereby being adapted to drive said generator and said kinetic energy supplying means through at least said second means, said first shaft, said one of said second gears, said first gear, said housing and said third means, first means connecting said first prime mover to drive said second shaft, said first prime mover thereby being adapted to drive said generator and said kinetic energy supplying means through at least said first means, said second shaft, said other of said second gears, said first gear, said housing and said third means, one of said prime movers normally driving said generator and said kinetic energy supplying means, the other of said prime movers being stationary when said one of said prime movers is under power and driving said generator, braking means for braking said one of said prime movers, and means for actuating said braking means to hold said one of said prime movers stationary when said other of said prime movers is under power and driving said generator, said kinetic energy supplying means being adapted to supply kinetic energy to said other of said prime movers to crank said other of said prime movers during at least a part of the transitional period when the load of said generator is being transferred from said one of said prime movers to said other of said prime movers.

16. The invention according to claim 15 wherein said one of said prime movers is an electric motor and said other of said prime movers is an internal combustion engine.

17. The invention according to claim 16 wherein said kinetic energy supplying means is a flywheel.

18. A no-break power supply comprising an electric motor, an internal combustion engine, a differential, an electric generator, first means connecting said differential to drive said generator, second means connecting said electric motor to drive said differential, said electric motor being adapted to drive said generator through at least said second means, said differential and said first means, and third means connecting said internal combustion engine to drive said differential, said internal combustion engine being adapted to drive said generator through at least said third means, said differential and said first means, said electric motor normally driving said generator, said internal combustion engine being stationary when said electric motor is under power and driving said generator, braking means for braking said electric motor, and means for actuating said braking means to lock said electric motor and hold said electric motor stationary when said internal combustion engine is under power and driving said generator.

19. A no-break power supply comprising a first prime mover, a second prime mover, a differential, kinetic energy supplying means, an electric generator, said differential comprising a rotatable housing and at least one first gear and two second gears therein, one of said second gears having a first shaft adapted to rotate with said one of said second gears, the other of said second gears having a second shaft adapted to rotate with said other of said second gears, said first gear meshing with said two second gears and being mounted on said housing for rotation with said housing and for rotation about the longitudinal axis of said first gear, first means connecting said first prime mover to drive said generator, second means connecting said first shaft to drive said generator, third means connecting said second prime mover to drive said second shaft, whereby said second prime mover is adapted to drive said generator through at least said third means, said second shaft, said gears, said first shaft and said second means, said second prime mover being stationary when said first prime mover is under power and driving said generator, braking means for braking said housing, and means for actuating said braking means to brake said housing when said second prime mover is under power and driving said generator, said housing being free to rotate when said first prime mover is under power and driving said generator.

20. A no-break power supply according to claim 19 wherein said first prime mover is an electric motor and said second prime mover is an internal combustion engine.

References Cited by the Examiner
UNITED STATES PATENTS

| | | | |
|---|---|---|---|
| 1,703,064 | 2/1929 | Griffiths | 290—4 |
| 2,433,194 | 12/1947 | Bedford et al. | 318—8 |
| 2,578,015 | 12/1951 | Reinhard | 318—8 |
| 2,989,675 | 6/1961 | Lowe | 318—212 |
| 3,050,635 | 8/1962 | Tanner | 290—4 |

ORIS L. RADER, *Primary Examiner.*